(12) United States Patent
Laurence et al.

(10) Patent No.: US 10,963,287 B2
(45) Date of Patent: Mar. 30, 2021

(54) REDUCING REQUEST LATENCY IN A MULTI-TENANT WEB SERVICE HOST

(71) Applicant: Amazon Technologies, Inc., Seattle, WA (US)

(72) Inventors: Douglas Stewart Laurence, Mercer Island, WA (US); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 16/366,795

(22) Filed: Mar. 27, 2019

(65) Prior Publication Data
US 2020/0310849 A1 Oct. 1, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 5,987,422 A * | 11/1999 | Buzsaki | ........... | G06Q 10/06311 705/7.13 |
| 9,052,933 B2 * | 6/2015 | Astete | ................ | G06Q 30/0601 |
| 9,069,607 B1 * | 6/2015 | Gopalakrishna Alevoor | .............. | G06F 8/65 |
| 9,098,329 B1 * | 8/2015 | Shepherd | ................ | G06F 9/505 |
| 9,280,369 B1 * | 3/2016 | Kirk | ....................... | G06F 21/566 |
| 9,645,847 B1 | 5/2017 | Roth | | |
| 9,792,141 B1 * | 10/2017 | Sethuramalingam | ..... | G06F 8/63 |
| 9,842,002 B2 * | 12/2017 | McGrath | ............... | G06F 9/5061 |
| 10,528,367 B1 * | 1/2020 | Liu | ....................... | G06F 9/4498 |
| 10,534,629 B1 * | 1/2020 | St. Pierre | ............. | G06F 9/5055 |
| 2007/0106541 A1 * | 5/2007 | Raisanen | .................. | G06F 8/45 705/7.11 |
| 2007/0239499 A1 | 10/2007 | Shukla et al. | | |
| 2009/0319256 A1 | 12/2009 | Chow et al. | | |
| 2012/0271797 A1 | 10/2012 | Patil | | |
| 2014/0149695 A1 * | 5/2014 | Zaslavsky | ........... | G06F 9/45558 711/162 |
| 2015/0121371 A1 * | 4/2015 | Gummaraju | ........ | G06F 9/45558 718/1 |
| 2015/0206079 A1 | 7/2015 | Sanabria et al. | | |

(Continued)

OTHER PUBLICATIONS

International Search Report and Written Opinion dated Jun. 17, 2020, in International Patent Application No. PCT/US2020/025079, filed Mar. 26, 2020.

*Primary Examiner* — Isaac T Tecklu
(74) *Attorney, Agent, or Firm* — Davis Wright Tremaine LLP

(57) ABSTRACT

A set of virtual machine configurations is loaded in memory. A set of software instructions that, as a result of being executed, performs a data operation is received from a client device associated with a customer of a service provider. A request to execute the set of software instructions is received. The set of software instructions is executed in a virtual machine derived from a member of the set of virtual machine configurations, and results of the data operation are provided in response to the request.

21 Claims, 8 Drawing Sheets

(56) References Cited

U.S. PATENT DOCUMENTS

| | | |
|---|---|---|
| 2015/0381590 A1* | 12/2015 | Bosko ................ H04L 63/0428 |
| | | 713/171 |
| 2016/0191627 A1* | 6/2016 | Huang ................ H04L 67/125 |
| | | 709/205 |
| 2017/0168903 A1 | 6/2017 | Dornemann et al. |
| 2017/0270440 A1 | 9/2017 | Garcia et al. |
| 2018/0276085 A1 | 9/2018 | Mitkar et al. |
| 2018/0341555 A1 | 11/2018 | Tsao et al. |
| 2019/0087213 A1 | 3/2019 | Matters et al. |
| 2019/0102209 A1* | 4/2019 | Astete .................... G06Q 30/02 |

* cited by examiner

REDUCING REQUEST LATENCY IN A MULTI-TENANT WEB SERVICE HOST

CROSS-REFERENCE TO RELATED APPLICATIONS

This application incorporates by reference for all purposes the full disclosures of co-pending U.S. patent application Ser. No. 16/366,976, filed concurrently herewith, entitled "CONTINUATION WORKFLOWS" and U.S. patent application Ser. No. 16/366,998, filed concurrently herewith, entitled "CHAINING VIRTUAL MACHINES".

BACKGROUND

It has become increasingly common for data management systems of computing resource service providers to store and retrieve data on behalf of multiple tenants. Such data management systems, sometimes referred to as a multi-tenant databases, face a variety of challenges related to servicing the requests of many customers of the computing resource service providers. One challenge is to minimize the impact to network bandwidth by the amount of data being transmitted across the network. Another challenge is to securely maintain and isolate the data of one customer from other customers. Still another challenge is to be quickly responsive to each of the many customers' requests.

BRIEF DESCRIPTION OF THE DRAWINGS

Various techniques will be described with reference to the drawings, in which.

DETAILED DESCRIPTION

Techniques and systems described below relate to a system that allows multiple customers of a data storage service of a computing resource service provider to concurrently execute software instructions in isolated virtual machines proximate to the data of the data storage service. In one example, a virtual machine configuration is derived from a base virtual machine. In the example, a runtime state of the virtual machine configuration is distributed among a plurality of host machines of a distributed data object storage service provided by a computing resource service provider. Further in the example, the plurality of host machines are caused to load the virtual machine configuration into memory based at least in part on the runtime state.

Still in the example, a request to perform one or more data operations by executing customer-provided software code on a host machine of the plurality of host machines is received from a client device associated with a customer of the computing resource service provider. In the example, a set of virtual machines based on the virtual machine configuration in the memory is caused to execute on the host machine. Also in the example, the customer-provided software code is executed in the set of virtual machines.

Still further in the example, a data operation is determined to have completed for a virtual machine of the set of virtual machines. Also in the example, the virtual machine is halted. Finally, in the example, results of the data operation are provided in response to the request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
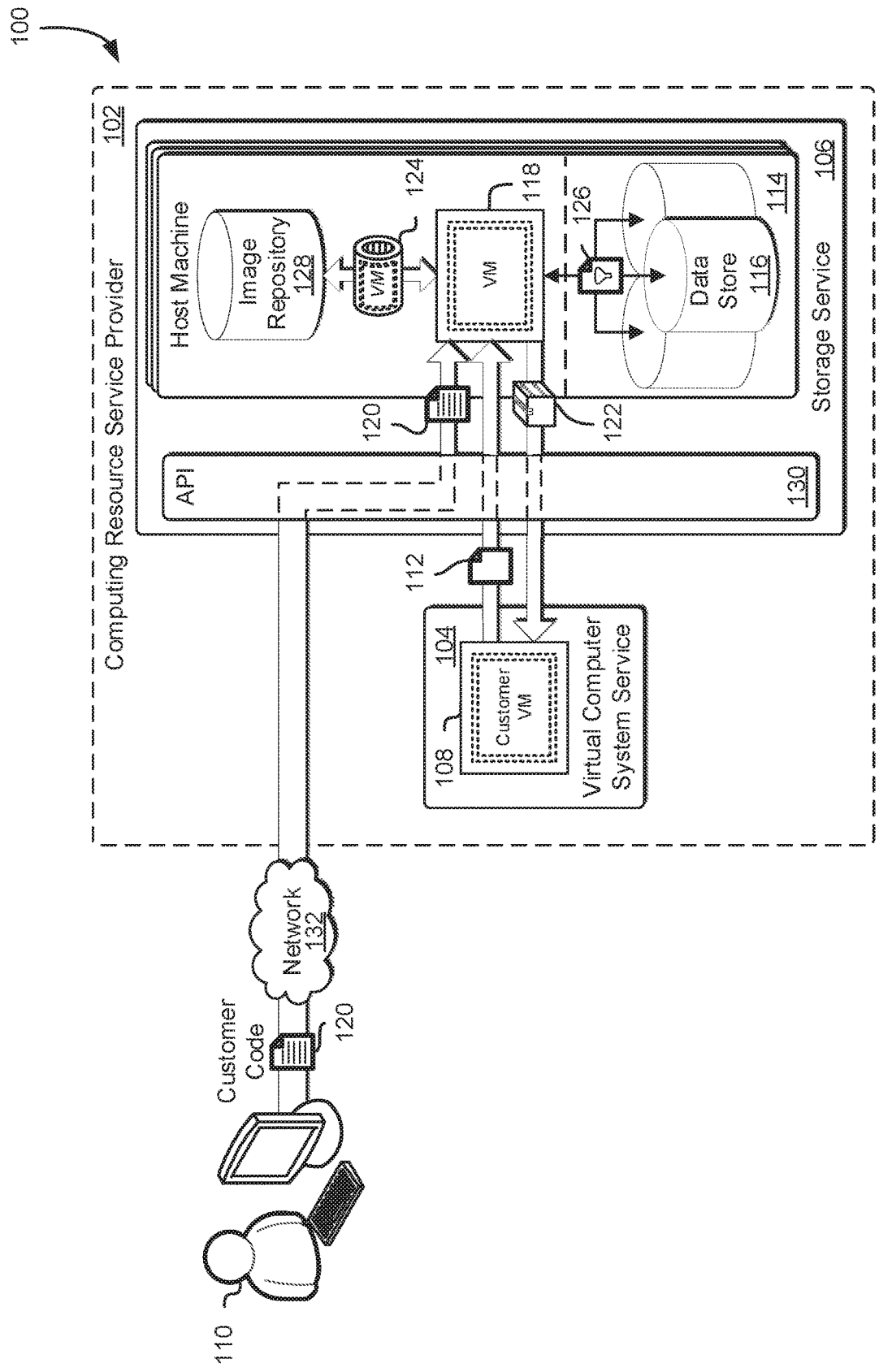
FIG. 1 illustrates an example of a storage service using virtual machines to isolate concurrent requests in accordance with an embodiment.

FIG. 1 illustrates an example system 100 in which various embodiments of the present disclosure may be practiced. As illustrated in FIG. 1, the system 100 may include customer code 120 (also referred to herein as "customer-provided software code") provided by customer 110 via a network 132. The customer code 120 can be submitted to an application programming interface 130 exposed by a storage service 106 of a computing resource service provider 102. The customer code 120 can be executed by a virtual machine 118 instantiated on a host machine 114 of the storage service 106. The virtual machine 118 may be derived from an image 124 stored in an image repository 128. Upon receipt of a request 112 (e.g., via the application programming interface 130) by a customer virtual machine 108 running on behalf of the customer 110 under a virtual computer system service 104, the virtual machine 118 may execute the customer code 120. Customer code 120 can be configured to perform, for example, a query 126 against a data store 116 of the storage service 106. A result of the query, data 122, can then be provided back (e.g., via the application programming interface 130) to the customer virtual machine 108 to satisfy the request 112. The dashed line indicates that, in some embodiments, the data store*116 is located on the host machine*114, whereas in other embodiments the data store*116 may be located at a different computing device from the host machine*114 that executes the virtual machine*118.

The computing resource service provider 102 may be an entity that provides one or more computing resource services to its customers individually or as a combination of services of a distributed computer system. Examples of types of computing resources provided by the computing resource service providers include infrastructure-as-a-service (IaaS), platform-as-a-service (PaaS), and/or software-as-a-service (SaaS). The one or more computing resource services of the computing resource service provider may be accessible to users via a network and may include services such as the virtual computer system service 104, a block-level data storage service, a cryptography service, an on-demand data storage service such as the storage service 106, a notification service, an authentication service, a policy management service, a task service, and/or other such services. Not all embodiments described include all of the services described, and additional services may be provided in addition to, or as an alternative to, services explicitly described.

In some examples, a "service" refers to an executing computer application that provides functionality to another computer application. In some examples, a "client" or "client device" refers to a computing system that utilizes the aforementioned service. For example, the customer 110 may utilize a client to send and receive communications to and from services of the computing resource service provider 102.

The customer 110 of the computing resource service provider 102 may communicate with one or more of the services via an interface (e.g., application programming interface 130), which may be a web services interface or any other type of customer interface. Each service provided by a computing resource service provider may have its own interface, and subsets of the services may have corresponding individual interfaces in addition to, or as an alternative to, a common interface. The customer 110 may communicate with the computing resource service provider 102 through the network 132. The network 132 may be a communication network between the customer 110 and the computing resource service provider 102. Examples of the network include the Internet, an intranet, an internet service provider (ISP) network, a local area network, a wide area network, Wi-Fi network, or other such network.

The virtual computer system service 104 may be used by a computing resource service provider to provide virtual computer system resources for the customer 110. The virtual computer system service may provide such computer system resources by instantiating virtual machine instances, such as the customer virtual machine 108, on physical hardware. The physical hardware may include physical hosts, which may include any device or equipment configured to execute instructions for performing data computation, manipulation or storage tasks, such as a computer or server similar to the electronic client device 802 or the application server 808 described in conjunction with FIG. 8. In embodiments, the virtual computer system service 104 may comprise a collection of computer resources, such as the physical hosts, configured to instantiate the customer virtual machine 108 on behalf of the customer 110.

The customer 110 may interact with the virtual computer system service 104 to provision, place and operate virtual machine instances that are instantiated on physical computer devices hosted and operated by the computing resource service provider. The customer 110 may communicate with the virtual computer system service 104 via a different application programming interface from the application programming interface 130 of the storage service 106. The virtual machine instances, such as the customer virtual machine 108, hosted by the virtual computer system service 104 may be used for various purposes, such as to operate as servers supporting a website, to operate business applications or, generally, to serve as compute power for the customer. Other applications for such virtual machine instances may be to support database applications, electronic commerce applications, business applications and/or other applications.

The storage service 106 may be an on-demand data storage service that comprises a collection of computing resources configured to synchronously process requests to store and/or access data. The storage service 106 may allow data to be provided in response to requests for the data using computing resources (e.g., databases) that enable the storage service 106 to locate and retrieve data quickly. For example, the storage service 106 may maintain stored data in a manner such that, when a request for a data object is received, the data object can be provided (or streaming of the data object can be initiated) in a response to the request. As noted, data stored in the storage service 106 may be organized into data objects. The data objects may have arbitrary sizes except perhaps for certain constraints on size. Thus, the storage service 106 may store numerous data objects of varying sizes. The storage service 106 may operate as a key value store that associates data objects with identifiers of the data objects which may be used by the customer 110 to retrieve or perform other operations in connection with the data objects stored by the storage service 106.

The customer virtual machine 108 may be a virtual machine instance executing under the virtual computer system service 104 on behalf of the customer 110. In some examples, the term "virtual machine" refers to an emulation, in software and/or hardware of a physical computer system, such that software executing in the virtual machine environment behaves as if the virtual machine were a physical computer. The virtual machine may include various virtual computer components, such as one or more virtual processors, virtual memory, or other virtual devices. The virtual processors, virtual memory, and/or other virtual device(s) may emulate a physical analogue while utilizing a share of one or more of the host computing device's physical processors, memory, or other devices to perform respective virtual functions. The virtual machines may be provided to customers of the computing resource service provider 102 via the virtual computer system service 104, and the customers may run operating systems, applications and/or other such computer system entities on the virtual machine.

In some examples, the term "virtual machine instance" refers to a virtual machine that is instantiated and executing on a host computer system. The virtual machine instances may be used for various purposes, such as to operate as servers supporting a web site, to operate business applications or, generally, to serve as compute power for the customer. Other applications for the virtual machine instances may be to support database applications, electronic commerce applications, business applications and/or other applications.

The customer 110 may be an individual associated with a customer account of the computing resource service provider 102, or may be another entity (e.g., individual, device, application, etc.) authorized to act on behalf of the individual associated with the customer account. Furthermore, the resources (e.g., the customer virtual machine 108) of the customer 110 may be made available to other users. For example, the customer 110 may utilize the customer virtual machine 108 to provide a website accessible to other users; these other users utilize the website to perform various operations (e.g., buy/sell goods or services, upload/download data, stream digital media, etc.). The customer 110 may communicate with the services of the computing resource service provider 102 through the network 132.

The request 112 may be a request to cause the virtual machine 118 to perform a query against data of the data store 116 using the customer code 120. For example, the request 112 may include a set of parameter values to pass to the executing customer code as input. The set of parameter values may include information such as one or more of a location (e.g., a Uniform Resource Indicator (URI) of the data in the data store 116), an identifier of a record, search criteria (e.g., keyword, date/time range, mathematical symbol ("<," ">," "=," etc.), wildcard character (e.g., "*," "?," "%," etc.), etc.), field name, data store name, and so on.

The host machine 114 may be a device or equipment of one or more such host machines (also referred to as a "fleet" of hosts) of the storage service 106. The host machine 114 may be configured to instantiate one or more virtual machine instances. The host machine 114 may be a computer or server similar to the electronic client device 802 and the application server 808 described in conjunction with FIG. 8. The computing resource service provider 102 may provide access to the host machine 114 via the application programming interface 130. The customer 110 may interact with the virtual machine 118 service to execute custom software code to query the data store 116 of the storage service 106 operated by the computing resource service provider.

The data store 116 may be a repository for data objects, such as database records, flat files, and other data objects. Examples of data stores include file systems, relational databases, non-relational databases, object-oriented databases, comma delimited files, and other files. In embodiments, the data store 116 is a distributed data store in which portions of the data stored in the distributed data store are distributed and/or duplicated across a plurality of storage devices and/or computing devices. In some embodiments, the host machine 114 is one of the computing devices that stores portions of the data. In other implementations, the host machine 114 is a separate computing device from the computing devices that store portions of the data.

The customer code 120 may be a set of computer-executable instructions comprising a computer program (also referred to as an "application") that is executed by a computer system, such as the virtual machine 118. In embodiments, the customer code 120 is designed to be executed by a particular system configuration, such as the virtual machine 118, to perform a query, such as the query 126, of data in the data store 116. For example, the customer code 120 may be designed to decompress a data object that has been stored compressed using a particular file compression format (e.g., gzip, Lempel-Ziv (LZ), LHA, etc.), recompress the data object using a different file compression format, and write the recompressed data object back to the data store 116. As another example, the customer code 120 may be designed to update encrypted data to use a new cryptographic key (e.g., key rotation) by reading an encrypted data object from the data store 116, decrypting the encrypted data object using the old key, re-encrypting the decrypted data object using the new key, and writing the re-encrypted data object back to the data store 116.

The virtual machine 118 may be a virtual machine similar to the customer virtual machine 108, except that the virtual machine 118 executes on the host machine 114 of the storage service 106, but is instantiated upon the request 112 to execute the customer code 120 and is terminated or paused (depending on the particular embodiment) upon completion of the execution of the customer code 120. The virtual machine 118 may be one of one or more virtual machines executing simultaneously on the host machine 114. In some cases, a plurality of virtual machines similar to the virtual machine 118 may be executing on the host machine 114 concurrently on behalf of the customer 110. Each of the plurality of virtual machines executing on the host machine 114 may be executing the customer code 120 or may be executing different customer code.

In some cases, the virtual machine 118 may be executing on the host machine 114 concurrently with one or more other virtual machines belonging to another customer. For example, like the host machines that host the customer virtual machine 108, the host machine 114 may be multi-tenant such that the host machine may allow one or more virtual machines provided to multiple customers by the computing resource service to run concurrently.

The virtual machine 118 may be specific to the customer 110 such that the virtual machine 118 is dedicated to run on behalf of the customer 110 rather than being usable by more than one customer of the computing resource service provider. The virtual machine 118 may be constrained to have a specified number of virtual processors and a specified amount of virtual memory, the number and amount of which may vary based on a type of service-level agreement (SLA) that the customer 110 has with the computing resource service provider 102.

The virtual machine 118 may be "isolated" from other virtual machines running on the host such that the virtual machine 118 may only be authorized to access resources (e.g., data stores, etc.) to which the customer 110 has access. In some embodiments, virtual machine isolation and/or isolation of the customer code 120 from other customers may be aided using processor affinity to bind and unbind the virtual machine processes to a designated central processing unit. In this manner, data of one customer is protected against access by another customer or entity. In some embodiments, the virtual machines of the host machine 114 are implemented using hardware virtualization (e.g., Intel VT-x, Intel APICv, AMD-V, AMD AVIC, Via VT, etc.).

In some examples, "multitenancy" or "multi-tenant" refers to multiple customers of the computing resource service provider 102 running separate virtual machines concurrently on the same host machine. For example, each host machine may run a virtualization layer such as a hypervisor or virtual machine manager that enables the physical hardware of a host computing system to be used to provide computational resources upon which one or more virtual machines may operate. The virtualization layer may be any device, software or firmware used for providing a virtual computer platform for the virtual machines. In some embodiments, the virtualization layer is a kernel-based virtual machine (KVM) infrastructure for a Linux kernel. Thus, the host machine 114 may be executing the virtual machine 118 concurrently with one or more other virtual machines that correspond to other customers of the computing resource service provider 102.

The image 124 may be a snapshot of the state of a system (e.g., the virtual machine 118) at a particular point in time. The image 124 may be utilized to restore the system to the state it was at the particular point in time. In the example illustrated in FIG. 1, the virtual machine 118 is launched from the image 124 retrieved from the image repository 128.

The query 126 may be an operation performed with data stored in the data store 116 initiated by execution of the customer code 120. Note that the query 126 may be one or more queries performed by execution of the customer code 120. For example, the customer code 120 may be designed to read a data object from the data store 116, modify the data object, write the modified data object back to the data store, read another data object from the data store 116, and so on. Thus, query 126 may represent any operation that may be performed with data in the data store 116, such as reading, writing, inserting, deleting, etc.

The data 122 may be the result of the query 126. Depending on the type of query, in some cases the data 122 may be an acknowledgement of queried—for data being either present in or absent from the data store 116. In other cases, the query 126 may have been a fetch (also referred to as "get") query, in which case the data 122 may be the data fetched from the data store 116 as a result of successful execution of the query 126. In other examples, execution of the customer code 120, in addition to performing the query 126, may modify data retrieved from the data store 116; for example, the execution of the customer code 120 may redact or otherwise omit sensitive information from the results of the query 126 from the data 122, such as by replacing social security numbers with "xxx-xx-xxxx."

The image repository 128 may be a data store storing one or more images of different virtual machine configurations, such as the image 124. In some embodiments, the image repository 128 is located on the same host machine that hosts the virtual machine 118. In other embodiments the image may be located on a separate device.

In some embodiments, the services provided by a computing resource service provider may include one or more interfaces, such as the application programming interface 130, that enable the customer to submit requests via, for example, appropriately configured application programming interface (API) calls to the various services. The application programming interface 130 may be a set of subroutine definitions, communication protocols, and/or software tools that provide a method of communication with components of the storage service 106. In addition, each of the services may include one or more service interfaces that enable the services to access each other (e.g., to enable the customer virtual machine 108 of the virtual computer system service 104 to store data in or retrieve data from the storage service 106 and/or access one or more block-level data storage devices provided by a block-level data storage service). Each of the service interfaces may also provide secured and/or protected access to each other via encryption keys and/or other such secured and/or protected access methods, thereby enabling secure and/or protected access between them. Collections of services operating in concert as a distributed computer system may have a single front-end interface and/or multiple interfaces between the elements of the distributed computer system.

Embodiments of the present disclosure may be particularly advantageous where the size (e.g., in bytes) of the set of executable software instructions is smaller than the data being accessed because less data may need to be transmitted over a network. Take for example, 20 kilobytes of executable software instructions that can be utilized to read, search through, and/or modify 5 gigabytes of data stored in the data store 116. If the 20 kilobytes of executable software instructions are executed at the virtual computer system service 104, the 5 gigabytes of data may need to be transmitted between the storage service 106 to customer virtual machine 108 of the virtual computer system service 104 over a network (e.g., local area network), thereby taking up bandwidth that could be used for other customers of the computing resource service provider 102. Alternatively, if the 20 kilobytes of data are transmitted from the customer virtual machine 108 to storage service 106, where they are executed by the host machine 114 that hosts the data store 116, the 5 gigabytes of data need only be transmitted between internal buses of the host machine 114 itself, which may be much faster than having to transmit the data to the customer virtual machine 108 and may conserve internal network bandwidth for other customers of the computing resource service provider 102.

As an illustrative example of a workflow for the system 100 of FIG. 1, the customer 110 may provide the computing resource service provider 102 with the customer code 120 that submits a query to obtain a data object from the data store 116. In the illustrative example, the customer 110 also has the customer virtual machine 108 which hosts a website that, based on input of a user of the website, submits the request 112 to the storage service 106 to execute the customer code 120. For example, the request 112 may be to obtain a data object associated with the user (e.g., profile information, account settings, etc.). In the illustrative example, upon receiving the request 112, the storage service 106 selects the host machine 114 and sends a command to cause the host machine 114 to instantiate the virtual machine 118 to execute the customer code 120, thereby causing the data 122 to be obtained from the data store 116. Then, in the illustrative example, the storage service 106 provides the data 122 back to the customer virtual machine 108 that submitted the request 112.

An example use case may be that the customer 110 has access to a large amount of images stored in the data store 116 and may be utilizing the customer virtual machine 108 to perform a machine learning algorithm to recognize certain objects within the images (e.g., a blue car). However, rather than transmitting each image from the data store 116 to the customer virtual machine 108, the customer 110 provides the customer code 120 that performs an initial screen of the images. For example, the customer virtual machine 108 may send the request 112 to retrieve images which may cause the customer code 120 to be executed on the host machine 114 and retrieve each of the customer images from the data store 116 and only transmitting images back to the customer virtual machine 108 that meet the screening criteria (e.g., rejecting images that do not contain more than a certain number of blue pixels).

Figure 2:
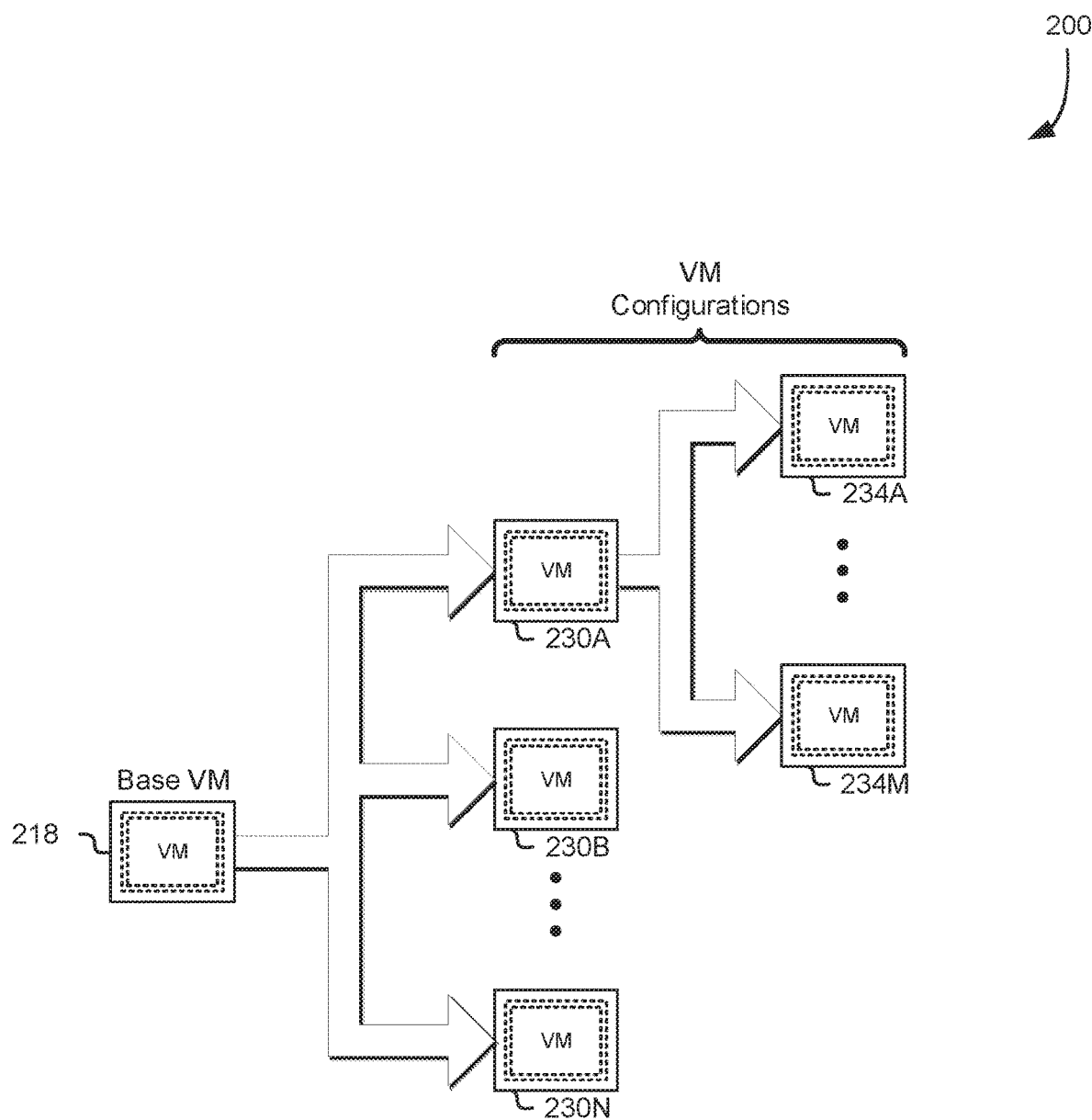
FIG. 2 illustrates an example of virtual machine configurations derived from a base virtual machine in accordance with an embodiment.

FIG. 2 illustrates an example 200 of an embodiment of the present disclosure. Specifically, FIG. 2 depicts a base virtual machine 218 that is used in the creation of particular virtual machine configurations 230A-30N and the particular derived virtual machine configurations 234-34M as described in reference to FIG. 5. The base virtual machine 218 may comprise a hardware virtualized state that has been booted up with a kernel and paused in a state ready to be configured with an operating system and/other applications and libraries. The base virtual machine 218 may be stored as a snapshot image in the paused state and restored as many times as is needed to configure the particular virtual machine configurations 230A-30N. In some embodiments, the base virtual machine 218 may be common to multiple or all customers of a computing resource service provider. In some embodiments, customers of the computing resource service provider may be provided with individual base virtual machines of their own by the computing resource service provider.

The particular virtual machine configurations 230A-30N may each be derived from the base virtual machine 218. For example, for each of the particular virtual machine configurations 230A-30N, a virtual machine may be instantiated from the snapshot image of the base virtual machine 218, an operating system may be installed to the virtual machine and any software (e.g., command interpreters, code libraries, etc.) needed to execute a particular set of executable software instructions as described in the present disclosure may be installed. Each of the particular virtual machine configurations 230A-30N may be paused the particular virtual machine configuration reaches a stable state. In some examples, a "stable state" refers to a state of execution of the virtual machine whereby the software (e.g., operating system, compiler, etc.) needed to execute the particular set of executable software instructions is launched to the point of being ready/able to receive and execute a set of executable software instructions (e.g., the customer code*120) to execute (referred to as a "stable state" in the present disclosure). For example, for a particular virtual machine configuration 230A, a virtual machine may be instantiated from the base virtual machine 218 and a set of software applications (e.g., a RedHat Linux operating system, a Python command interpreter, an application programming interface configured to receive a set of software instructions and provide the set of software instructions to the Python, and other software for the particular configuration) may be installed and executed on the launched virtual machine. At a point in time when the set of software applications are ready/able to receive and execute the set of software instructions, the virtual machine of the present disclosure may be said to be in a stable state at that particular point in time.

The state of each of the particular virtual machine configurations may be stored and distributed to one or more host machines of the computing resource service provider, whereupon each of the particular virtual machine configurations may be instantiated (e.g., the shared static particular virtual machine configuration 318 of FIG. 3) to execute a set of executable software instructions. In some examples, a "clone" refers to a state of a particular virtual machine that has been distributed/copied to the one or more host machines. A plurality of such clones, consequently, may each be instantiated, consecutively or concurrently, to begin execution from the (same) state of the particular virtual machine configuration.

The derived particular virtual machine configurations 234A-34M are presented to illustrate that further virtual machine configurations may be derived from a particular virtual machine configuration; in this illustrative case, the particular virtual machine configuration 230A. For example, the particular virtual machine configuration 230A may be a virtual machine configured with a Linux operating system capable of executing standard Python software code. The derived particular virtual machine configuration 234A may be Linux capable of executing Python software code with the addition of support for Python cryptographic libraries, the derived particular virtual machine configuration 234M may be Linux capable of executing Python software code as well as capable of executing C software code, and so on. Thus, the virtual machine configurations may be derived from other virtual machine configurations, all descending from the root base virtual machine 218.

In embodiments, the virtual machine configurations 230A-30N and 234A-34M derived from the base virtual machine 218 may be stored as their set of differences from the base virtual machine 218 and/or parent virtual machine. In this manner, the virtual machine configurations 230A-30N and 234A-34M may be recreated by applying the differences (delta) to the base virtual machine 218. In this manner, memory and other storage resources may be conserved because the system of the present disclosure need not store an entire virtual machine image for the virtual machine configurations 230A-30N and 234A-34M, only their differences from the base virtual machine 218.

Figure 3:
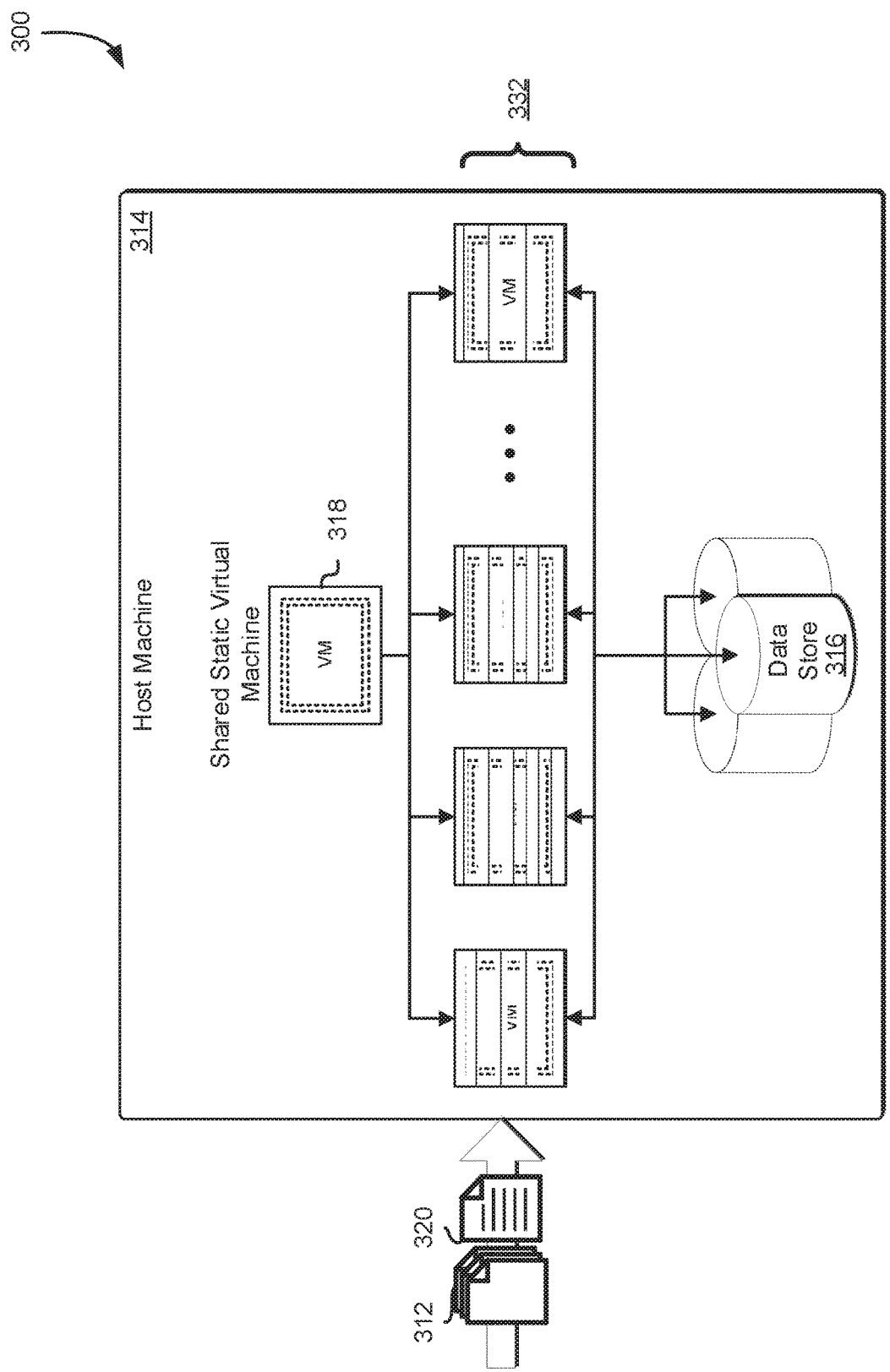
FIG. 3 illustrates an example of running cloned virtual machines on a host machine in accordance with an embodiment.

FIG. 3 illustrates an aspect of a system 300 in which an embodiment may be practiced. Specifically, FIG. 3 illustrates the copy-on-write (CoW) aspect of certain embodiments of the present disclosure that provides a benefit of being able to quickly and efficiently instantiate running clone virtual machines 332 while making efficient usage of memory resources. In FIG. 3, the shared static particular virtual machine configuration 318 may be used to instantiate any number of the running clone virtual machines 332 at the state of the shared static particular virtual machine configuration 318.

The shared static particular virtual machine configuration 318 may be an instantiation of an in-memory representation of a particular virtual machine configuration (as described in the present disclosure) at a state (e.g., memory content, processor registers, etc.) at which it was paused. In some embodiments, the shared static particular virtual machine configuration 318 is built from a base image and a delta from the base image that corresponds to a particular virtual machine configuration. In other embodiments, the shared static particular virtual machine configuration 318 is loaded from a single particular virtual machine configuration image.

For example, a computing resource service provider such as the computing resource service provider 102 of FIG. 1 may have a number of stored particular virtual machine configurations as deltas along with a corresponding base image or as entire images available (e.g., the virtual machine 118) for selection by its customers to use for executing sets of executable software instructions, such as the set of executable software instructions 320. The computing resource service provider may distribute the particular virtual machine configurations to one or more host machines of a data storage service of the computing resource service provider. Upon receiving a request from a customer of the data storage service, such as the customer 110, to execute the set of executable software instructions 320, the host machine 314 may read (from local persistent storage) the shared static particular virtual machine configuration 318 into CoW pages of memory. Note that if the shared static particular virtual machine configuration 318 is already in memory, this operation may not need to be performed. In some embodiments, the shared static particular virtual machine configuration 318 may be pre-loaded in volatile memory in anticipation of receiving a request to instantiate the running clone virtual machines 332 to execute the set of executable software instructions 320.

The shared static particular virtual machine configuration 318, once in CoW memory, may be used to launch one or more running clone virtual machines 332 to execute the set of executable software instructions 320. In some examples, "copy-on-write" refers to a technique of making data read-only ("static") until a modification (e.g., "write") to the data is made. The modified data is then "copied" to a read-write location, and a subsequent read/write operation to the modified data may be performed to the modified data at the read-write location. In this manner, the running clone virtual machines 332 can share and utilize the shared static particular virtual machine configuration 318 in read-only memory for their instance except for portions they write to, which may be copied to a separate read-write memory space specific to that running clone virtual machine. Hence, the running clone virtual machines 322 are depicted in FIG. 3 as partial representations of virtual machines. By sharing the shared static particular virtual machine configuration 318 in this way, memory of the host machine 314 may be utilized more efficiently because additional memory may be allocated only to data that is modified from the original of the shared static particular virtual machine configuration. In some embodiments, a Kernel-based Virtual Machine (KVM) shared memory technique of VirtIO is used to allow reads and writes to be performed in and out of the hypervised virtual machine.

The running clone virtual machines 332 may be N-number of virtual machines instantiated from the shared static particular virtual machine configuration 318 to execute the set of executable software instructions 320. Once a clone of a particular virtual machine configuration is instantiated, its state may diverge from other instantiated clones of the same particular virtual machine configuration; consequently, such instantiated clones may be referred to herein as "running clones." In some embodiments, the shared static particular virtual machine configuration and the running clone virtual machines 332 may be instantiated on behalf of a single customer, such as the customer 110 of FIG. 1. However, because the shared static particular virtual machine configuration 318 may be CoW, the shared static particular virtual machine configuration 318 may be shared among running clone virtual machines 332 of different customers without risk of compromising customer data because the read-write portions of memory allocated to the running clone virtual machines 332 may be isolated from each other. Thus, each of the customers may provide different sets of executable software instructions to their respective running clone virtual machines while still sharing the shared static particular virtual machine configuration 318. Furthermore, the running clone virtual machines 332 may each be provided (e.g., by the host machine 314) with a copy of the set of executable software instructions 320 ready to be executed upon request (e.g., upon receiving the set of parameter values 312). In this manner, delay between a request to execute the set of executable software instructions 320 and execution may be reduced because the running clone virtual machines 332 are already standing by to execute the set of executable software instructions 320. In some embodiments, rather than the shared static virtual machine configuration 318, the base image may be loaded into CoW pages as a static base image, and the deltas containing the differences from the base image particular to the particular virtual machine configurations may be loaded into non-CoW to create the running clone virtual machines 332.

The host machine 314 may be a physical computing system configured to instantiate and run virtual machines on behalf of another entity, such as the customer 110 of FIG. 1, similar to the host machine 114. As noted, the host machine 314 may be multi-tenant such that the running clone virtual machines 332 may be associated with multiple customers of the computing resource service provider that manages the host machine 314 or other authorized entities.

The data store 316 may be a data store similar to the data store 116 of FIG. 1. In some implementations, the data store 316 may be a member of a distributed data store that stores data of the customer associated with the running clone virtual machines 332 (e.g., the customer 110 of FIG. 1). For example, the data of the customer may be distributed among multiple data stores of multiple host machines of a data storage service. In some embodiments, at least a portion of the data of the customer may be stored locally on the host machine 314 while other portions of the customer's data may be stored on different host machines of the data storage service. Thus, in such embodiments, execution of the set of executable software instructions 320 by the running clone virtual machines 332 may access the data store 316 for the portions of the data stored locally, but may access the data store of a different host machine for portions of the data of the customer stored with the different host machine.

Note, however, that although embodiments of the present disclosure are described as running on the host machine 314 of a storage service, it is contemplated that techniques described in the present disclosure may be applied to quickly and efficiently execute the set of executable software instruction 320 in the running clone virtual machines 332 on the host machine 314 of other services provided by a computing resource service provider. For example, using the static particular virtual machine configuration 318 in CoW pages of memory, one or more of the running clone virtual machines 332 may be instantiated within a couple of milliseconds or less using the shared static particular virtual machine configuration 318 in a virtual computer system service. Moreover, once each of the running clone virtual machines 332 completes its task, it may be quickly terminated and its respective modified memory pages may be wiped/erased (e.g., overwritten with zeroes), deallocated from its assigned clone virtual machine, and re-used for other purposes. In this manner, embodiments of the present disclosure may allow a customer to cause the set of executable software instructions 320 to be quickly executed and exit, freeing resources (e.g., memory space, processor capacity, etc.) to allow other customers to share either or both the host machine 314 and the shared static particular virtual machine configuration 318 for executing their own sets of executable software instructions.

In some embodiments, as noted above, upon completion of execution of the set of executable software instructions 320, the running clone virtual machines 332 may be paused and/or stored. Upon a subsequent request to execute the set of executable instructions 320, the paused running clone virtual machines may be unpaused and caused to re-execute the set of executable software instructions 320.

The set of executable software instructions 320 may be executable program code similar to the customer code 120 of FIG. 1. In embodiments, the set of executable software instructions 320 may be provided to the computing resource service provider that hosts the host machine 314 by the customer associated with the running clone virtual machines 332. In other implementations, the computing resource service provider may provide pre-approved sets of executable instructions for selection by its customers to execute in the running clone virtual machines 332. In some implementations, the set of executable software instructions 320 may be accompanied by, or may be configured to receive upon being executed, a set of parameter values 312.

The set of parameter values 312 may be a set of values passed by the customer as input to the executing set of executable software instructions 320. The set of parameter values may be similar to the values passed in the request 112 of FIG. 1. For example, the set of parameter values may include search criteria, filtering criteria, values that specify how to modify customer data, or any other parameter value as the set of executable software instructions 320 would be designed to receive. Note that each of the running clone virtual machines 332 may receive the same or different parameter values. For example, a first running clone virtual machine may receive parameter values indicating to search through a set of data for last names that start with the letter "A," while a second running clone virtual machine may receive parameter values indicating to search through the set of data for last names that start with the letter "B," and so on.

Figure 4:
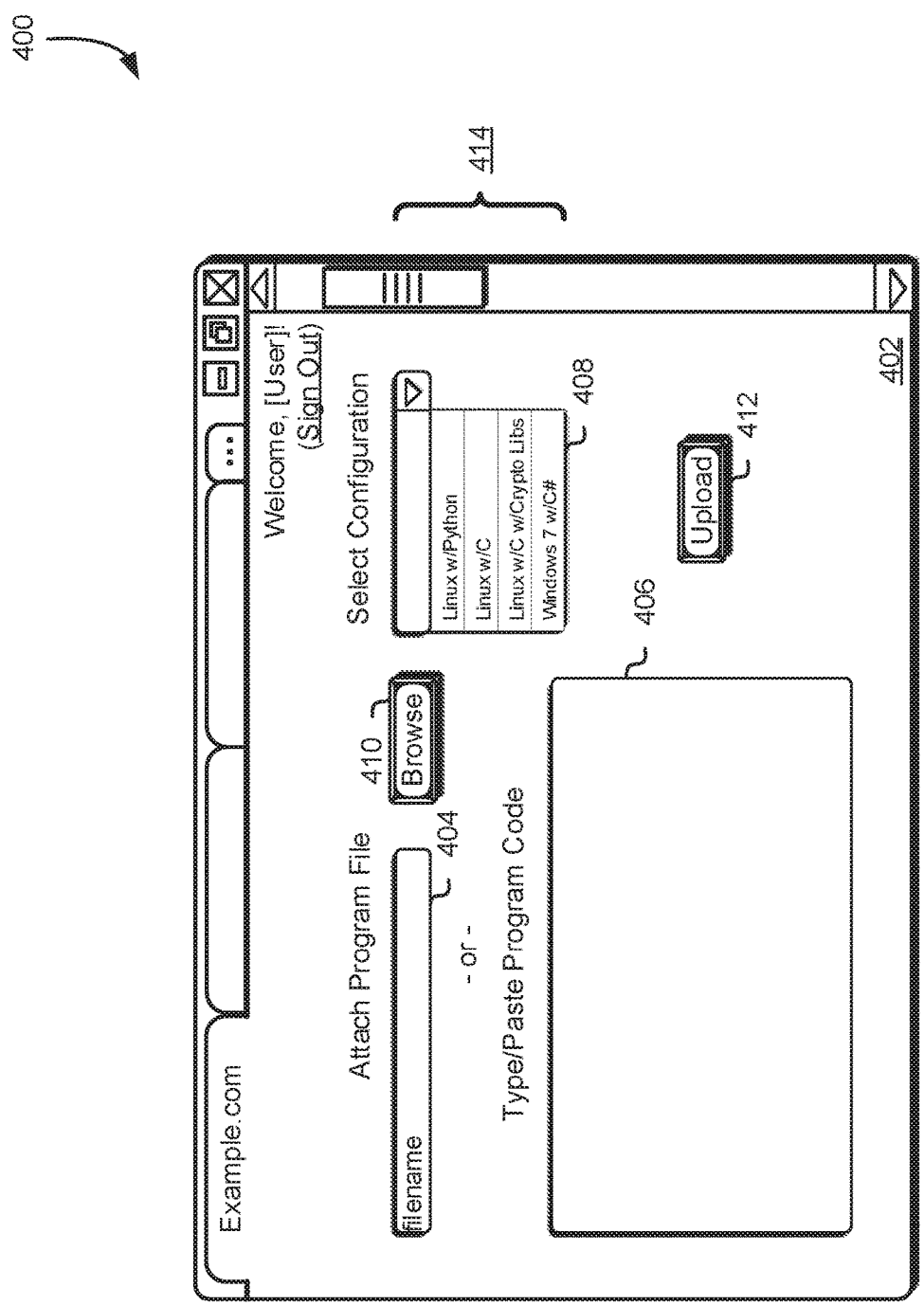
FIG. 4 illustrates an example of an interface for providing customer code in accordance with an embodiment.

FIG. 4 illustrates an example interface 400 of an embodiment of the present disclosure. As illustrated in FIG. 4, the example interface 400 may include a web page 402 that includes a number of form fields for inputting or selecting software code for executing in clone virtual machine instances and/or one or more particular virtual machine configurations for the running clone virtual machine instances.

The web page 402 may comprise content rendered to a display device via a software application, such as a web browser, executing on a client device (e.g., the electronic client device 802 of FIG. 8) of a customer of a computing resource service provider. The web page 402 may be fetched from a remote computing device (e.g., the web server 806) of the computing resource service provider. The web page 402 may include dynamically generated content and/or static content from one or more files of the computing resource service provider. The content may be derived from one or more markup languages, such as Hypertext Markup Language (HTML), Cascading Style Sheets (CSS), JavaScript, Perl, and so on. The web page may include a set of form elements and/or graphical elements, such as textboxes, radio buttons, checkboxes, dropdown lists, multi-select lists, images, animations, and so on, some of which may be described below.

The filename field 404 may be a form element for specifying a location (e.g., local or network location) of a file containing a set of executable software instructions to be executed in a clone virtual machine such as the running clone virtual machines 332 described in conjunction with FIG. 3. The filename field 404 may be associated with a browse button 410 that prompts the client device with a window to allow the customer to browse a local and/or network location for the file containing the set of executable software instructions. The code textbox 406 may be a form field element that allows the customer to type the set of executable software instructions into the box or to "paste" the set of executable software instructions into the box.

The configuration dropdown 408 may be a form field element that lists virtual machine configurations 414 for selection by the customer to execute the set of executable software instructions. The particular virtual machine configuration selected from the configuration dropdown 408 may correspond to the shared static particular virtual machine configuration 318 of FIG. 3.

The virtual machine configurations 414 may represent a set of virtual machine images paused at a particular state and stored by the computing resource service provider, the virtual machine images of the set having been pre-configured and made available to customers by the computing resource service provider for use in instantiating virtual machines on behalf of customers of the computing resource service provider. Selection and submission of a virtual machine configuration from the configuration dropdown 408 may cause the computing resource service provider to distribute one or more copies of the virtual machine image that corresponds to the selection to one or more host machines. The virtual machine configurations 414 may be configured to have the required resources and/or software to support executing software code. For example, the customer may paste executable software code written in Python in the code textbox 406 and select "Linux w/Python" from the configuration dropdown in order to cause the executable software code to be executed by a Linux virtual machine configuration capable of executing the Python executable software code.

Figure 8:
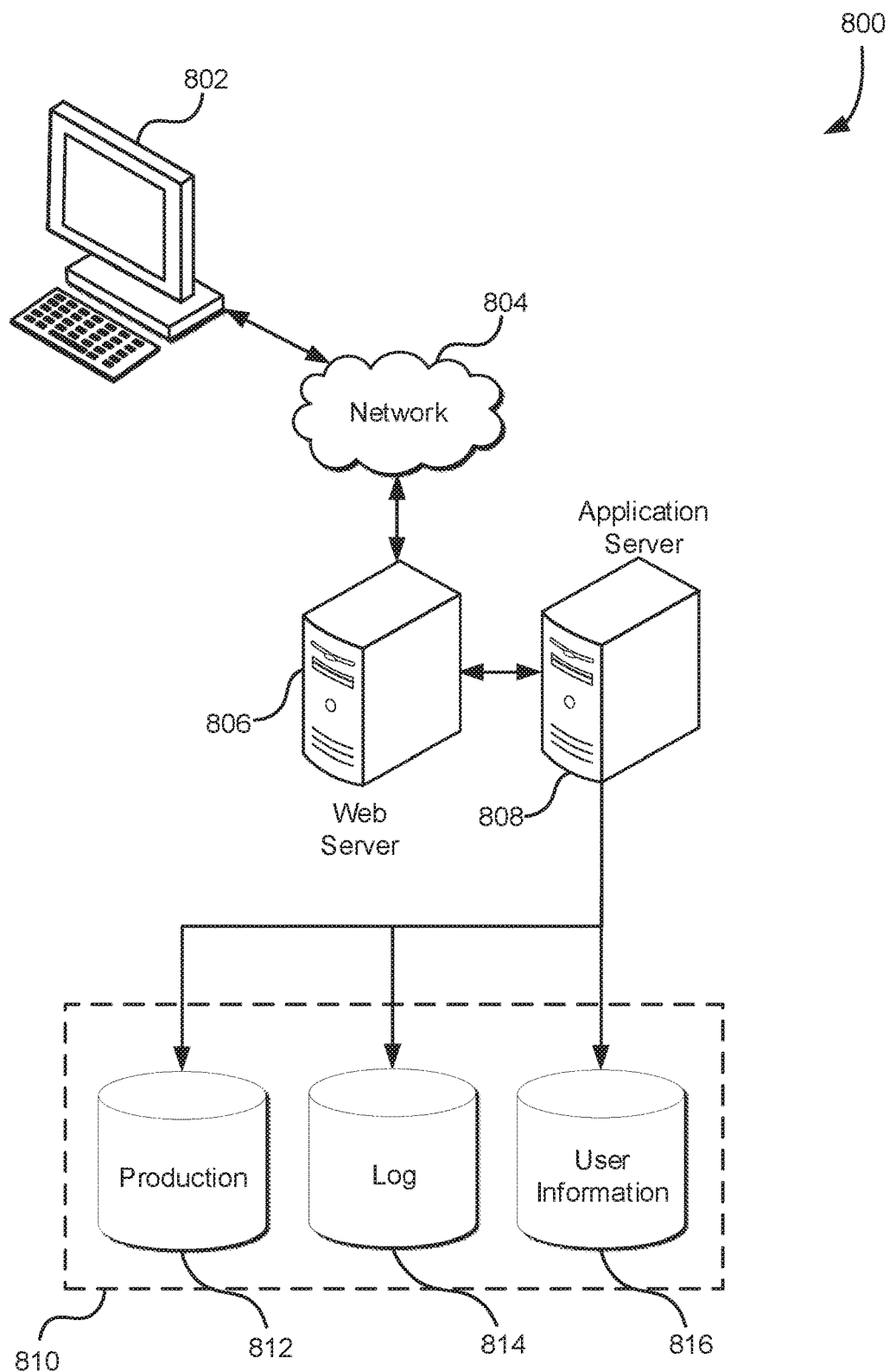
FIG. 8 illustrates a system in which various embodiments can be implemented.

The upload button 412 may be a form element that submits the form field values of the web page 402 to the computing resource service provider, such as via the web server 806 of FIG. 8. For example, clicking the upload button 412 may cause the source code of the set of executable software instructions, input either via the code textbox 406 or by indicating a file location via the filename field 404, and the virtual machine configuration selected from the configuration dropdown 408 to the web server 806 of the computing resource service provider.

Note that the example interface 400 is intended to be illustrative, and it is contemplated that different embodiments may have various types of interfaces for performing similar functions. The different embodiments may include more, less, or different form elements from those depicted in FIG. 4.

A separate interface may be used by the customer of the computing resource service provider to request that the software code provided via the example interface 400 be executed. In some implementations, the separate interface may additionally include form elements for specifying parameters to be provided to the executing software code as input. In some implementations, the separate interface may include a form element for specifying the number of clone virtual machines to instantiate to concurrently run the software code. In other implementations, the number of clone virtual machines may be determined by the host machine hosting the clone virtual machines based on the parameters (e.g., if the parameters contain multiple search criteria separated by a separator character, such as a comma or semicolon, the host machine may split the search criteria based on the separator character and instantiate a separate clone virtual machine to execute a search for each of the search criteria).

Figure 5:
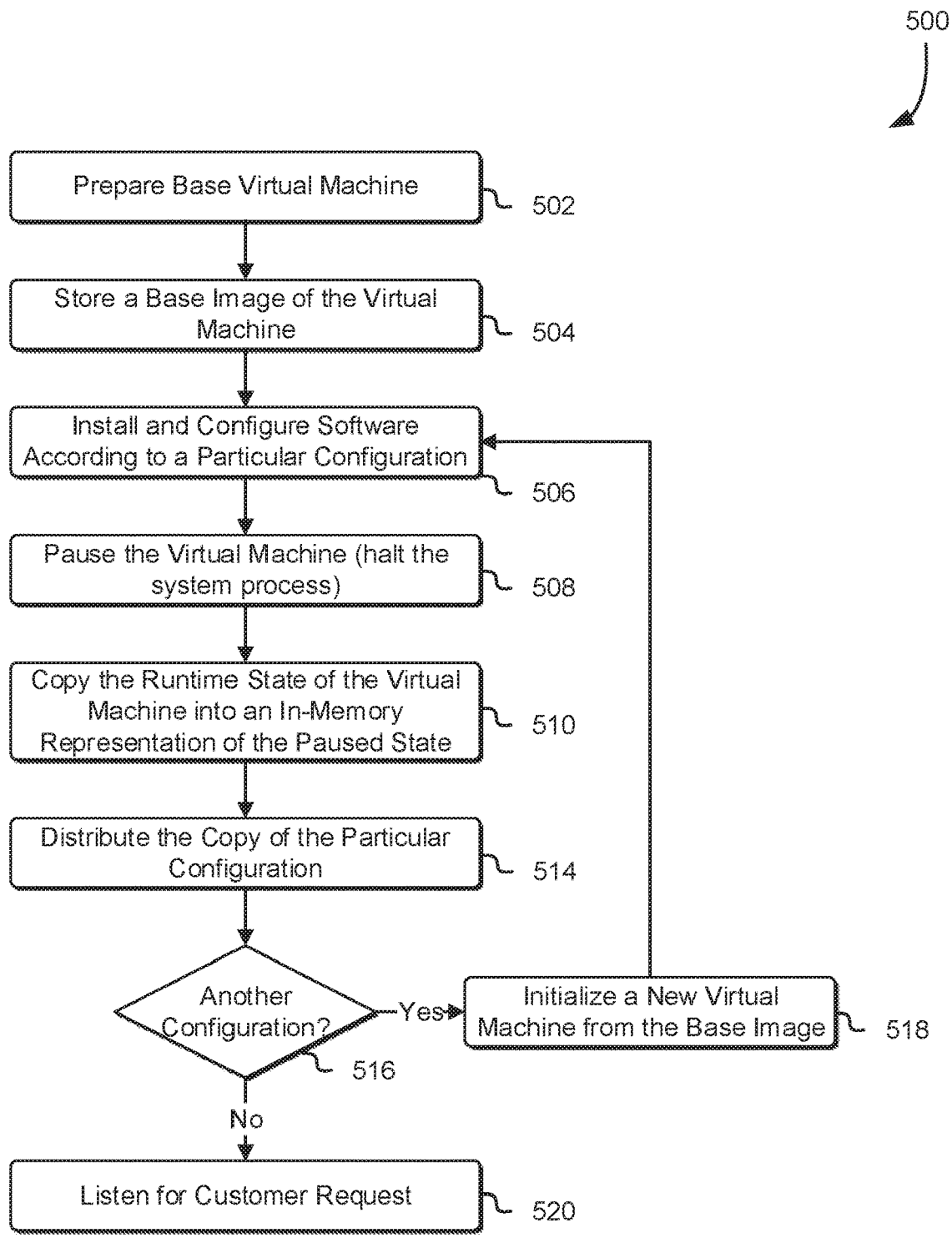
FIG. 5 is a flowchart that illustrates an example of creating and distributing particular virtual machine configurations in accordance with an embodiment.

FIG. 5 is a flowchart illustrating an example of a process 500 for creating and distributing particular virtual machine configurations in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. The process 500 includes a series of operations wherein a base virtual machine is prepared and an image of the base virtual machine is stored, a set of virtual machine configurations is created and stored based on the base virtual machine, the runtime states of the virtual machine configurations are distributed as clones of the particular virtual machine to be instantiated in response to a customer request to execute specified code under a particular virtual machine configuration.

In 502, the system performing the process 500 may instantiate a base virtual machine on a local host. In some implementations, the base virtual machine may include an emulation of the hardware of a physical computer system but may not include software, such as an operating system. In other implementations, the base virtual machine may include an operating system and/or additional software that will be common to the configurations described in the present disclosure. In some implementations, there may be multiple base virtual machines (e.g., for different operating systems) as anticipated. For example, in an implementation there may be a RedHat Linux base virtual machine and a Windows base virtual machine. In 504, the system performing the process 500 may store a snapshot of the base virtual machine image. In this manner, a new virtual machine instance may be instantiated to the state of the base virtual machine image and installed with software according to a particular virtual machine configuration for as many particular virtual machine configurations as are anticipated for use in executing software code in a storage service, such as the storage service 106 of FIG. 1.

In 506-18, particular virtual machine configurations may be created. Note that the operations of 506-18 may be repeated for each particular virtual machine configuration to be made available to execute customer software code. For example, in 506, particular software may be installed to the base virtual machine image to create a particular virtual machine configuration; e.g., the base virtual machine image may be installed with a particular operating system (e.g., any one of a variety of Linux distributions or Windows versions) and configured to support execution of software code written in one or more different languages (e.g., Python, Perl, C, C++, C#, Go, Node.js, etc.). As an illustrative example, a particular virtual machine configuration may be installed with Ubuntu Linux and a Python command interpreter for use in executing customer Python code, another particular virtual machine configuration may be installed with a Windows operating system and configured to execute Perl and C code, and yet another particular virtual machine configuration may be installed with RedHat Linux and designed to execute C code using cryptographic C libraries. In 508, the system performing the process 500 may pause the particular virtual machine configuration, such as by halting the system processes of the particular virtual machine.

In 510, the system performing the process 500 may copy the runtime state of the paused particular virtual machine configuration into an in-memory representation of that paused state (e.g., memory contents, state of processor registers, etc.). In some examples, "runtime" refers to the time during which a software program (e.g., executable software instructions) is executing. In some examples, a "runtime state" refers to a state of execution of that software program at a point in time. Thus, in some examples, the runtime state of a virtual machine refers to the state of execution of the virtual machine (e.g., virtual memory contents, state of registers of the virtual processor(s), etc.) at the point in time (e.g., the particular point in time at which the particular virtual machine was paused). The system may then store the in-memory representation of the state of the particular virtual machine to persistent storage such that the stored in-memory representation may be used as a source for "cloning" the paused particular virtual machine configuration's state to one or more host machines. In some examples, "cloning" refers to instantiating one or more virtual machine from a CoW copy of the particular virtual machine configuration. The one or more host machines may utilize the running clone particular virtual machine configuration to start a new system process with the same state as the original paused particular virtual machine configuration (e.g., such that the halted virtual machine configuration may be restored to the state it was at the particular point in time it was halted).

In some implementations, the stored state may be a snapshot of the halted virtual machine configuration. In other implementations, the stored state may be the differences, or deltas (Δs), between a snapshot of the halted virtual machine and the base virtual machine image such that the base virtual machine image may be instantiated and the Δ applied to the instantiated base machine to result in the particular virtual machine configuration at the state it was at the point in time it was halted. Note that there are a variety of ways of determining the Δ between the halted virtual machine configuration and the base virtual machine. In one example, a memory compare between the memory pages of the base virtual machine and the halted virtual machine configuration may be compared to identify the memory pages that have been modified from the state of the base virtual machine ("dirty pages"). In another example, memory pages of the particular virtual machine configuration are monitored from the host operating system and the memory pages that have changed are identified. These changes may be copied to a file representing the Δ from the base virtual machine image.

In 514, the system performing the process 500 may distribute/copy the file representing the state of the particular virtual machine configuration at the time it was halted (e.g., snapshot, Δ, etc.) to one or more host machines of a storage service, such as the host machine 114 of the storage service 106 of FIG. 1. The copied states of the particular virtual machine configuration at the time it was halted may be referred to as clones of the particular virtual machine. In some embodiments, the one or more host machines may load the particular virtual machine configuration into CoW pages of memory, as described in conjunction with FIG. 3, such that running clones (e.g., the running clone virtual machines 332) of the cloned particular virtual machine configuration (e.g., the particular virtual machine configuration 318) may be instantiated efficiently upon receipt of a request to execute customer code to the state the particular virtual machine configuration was in at the point at which it was halted. In embodiment where the file is a Δ between the particular virtual machine configuration and the base virtual machine, each of the host machines may also have a copy of the base virtual machine image such that any of the host machines may instantiate the particular virtual machine configuration by applying the Δ to an instantiation of the base virtual machine. In some embodiments, the system performing the process 500 may itself be one of the host machines of the storage service.

In 516, the system performing the process 500 may determine whether another particular virtual machine configuration is to be created in anticipation of executing customer code under the particular virtual machine configuration. For example, the system may receive a selection of a set of configurations from a system administrator or other authorized entity of a data storage service and the system may perform the operations of 506-18 for each of the configurations specified in the set, and determine that no other configurations remain when the operations have performed for each configuration in the set. As another example, the system may perform the operations of 506-18 based on historical usage data; for example, the system may determine the top five most popular configurations used by customers of the computing resource service provider to perform queries against data stores of the data storage service based on historical data (e.g., logs, usage records, etc.) and perform the operations of 506-18 to create particular virtual machine configurations for each of those popular configurations. If further particular virtual machine configurations are anticipated, the system performing the process may proceed to 518. Otherwise, if no further particular virtual machine configurations are anticipated, the system may proceed to 520.

In 518, the system performing the process 500 may instantiate a new virtual machine based on the base virtual machine image in order to have a "clean" virtual machine upon which to install and configure the next particular software configuration in 506. The system next returns to 506 to install and configure the next particular software configuration. In 520, the system performing the process 500 may wait to receive a request from a customer of the computing resource service provider to execute a set of executable software instructions under one of the particular virtual machine configurations created in 506-18. Upon receiving such a request, the system may perform the process 600 of FIG. 6 (e.g., at 604). Note that one or more of the operations performed in 502-20 may be performed in various orders and combinations, including in parallel.

Figure 6:
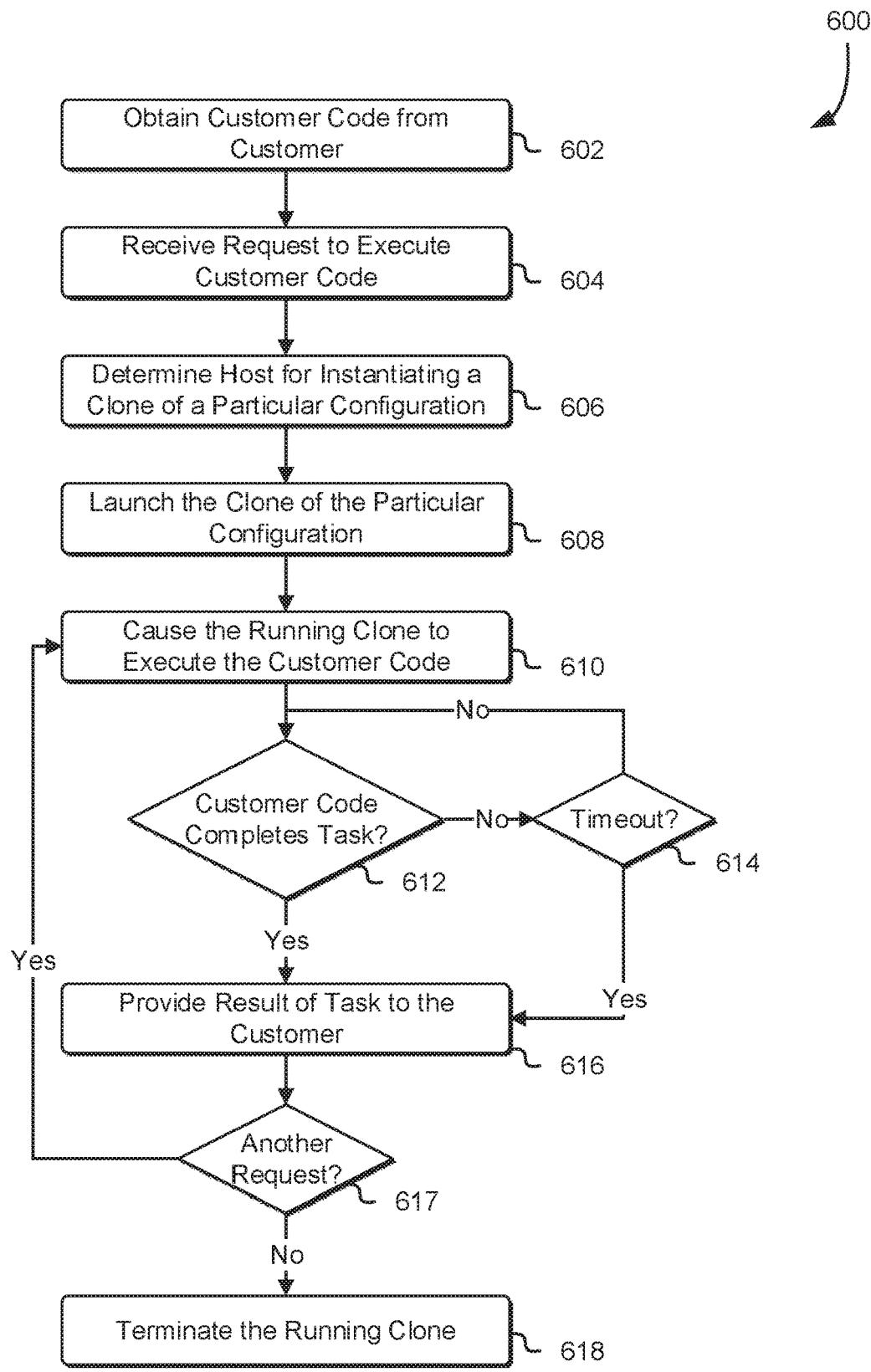
FIG. 6 is a flowchart that illustrates an example of a process for executing customer code within a data storage service in accordance with an embodiment.

FIG. 6 is a flowchart illustrating an example of a process 600 for executing customer code within a data storage service in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. The process 600 includes a series of operations wherein a customer of a computing resource service provider that provides data storage services to the customer provides a set of executable software instructions or selects a set of executable software instructions from a list, the customer requests the code to be executed, a particular virtual machine configuration appropriate to (e.g., capable of executing) the set of executable software instructions is instantiated and caused to execute the set of executable software instructions, and the result of the execution is provided to the customer.

In 602, the system performing the process 600 may obtain a set of executable software instructions (also referred to as "customer code" in the present disclosure) to be executed upon request from a customer of the computing resource service provider that hosts the system. In some embodiments, the customer provides the set of executable software instructions (e.g., via an application programming interface, such as the application programming interface 130 of FIG. 1) to be executed. In other implementations, the computing resource service provider may offer for selection to the customer, sets of executable software instructions; the customer may select from the sets a particular set of executable software instructions to be executed. In some embodiments, such as where the set of executable software instructions is stored in a file accessible to the one or more host machines upon which it is to be executed or where the customer selects the set of executable software instructions from sets made available by the computing resource service provider, the system may receive a reference (e.g., an identifier or location) to the set of executable software instructions and may locate and obtain the set of executable software instructions based on that reference. In some cases, the set of executable software instructions includes indications as to which data of the customer the set of executable instructions are to access and/or where in the data storage service the data is located.

In various implementations, the set of executable software instructions may be configured to receive, as input, one or more parameter values that may be included in the request to execute the customer code in 604. The customer may specify the one or more parameter values in the request to execute the set of executable software instructions. The set of executable software instructions may be stored in association with the customer in anticipation of a customer request to execute the set of software instructions in 604.

In 604, the system performing the process 600 may receive a request from the customer to execute the set of software instructions. In some implementations, the set of executable software instructions obtained from the customer in 602 is received together with the request to execute said set of executable software instructions. In some implementations, the request includes one or more parameter values to pass as input to the set of executable software instructions. For example, the set of executable software instructions may be configured to, upon execution, execute a query against data to locate data objects that match the one or more parameters (e.g., keywords, identifiers, date range, data object size, etc.). In some implementations, the customer may direct the system to execute a number of instances of the set of executable software instructions (e.g., running in parallel as a batch). For example, the customer may desire to perform multiple simultaneous queries against the customer's data, which may be duplicated and distributed among one or more hosts of the data storage service. In such a case, the system may determine to instantiate multiple virtual machine instances on the one or more hosts to execute the sets of executable software instructions to perform the queries in parallel as directed by the customer.

In 606, the system performing the process may determine a host of a data storage service, such as the host machine 114 of the storage service 106 of FIG. 1, upon which to instantiate a particular virtual machine configuration to execute the set of executable software instructions specified by the customer. In some implementations, the host upon which the particular virtual machine configuration is determined to be instantiated will be a host that is proximate to the data of the customer. For example, the system may determine which servers among a plurality of servers hosting data for customers of the computing resource service provider are hosting the data of the customer that submitted the request in 604, and the system may select the host or hosts from among the servers hosting the data of the customer. In some implementations, the customer may be associated with multiple sets of data, and the system may determine, based on the request and/or the set of executable software instructions, which of the multiple sets of data will be accessed (e.g., read from, written to, etc.) upon execution of the set of executable software instructions, and the system may select a host or hosts from among the servers that host that data.

In 608, the system performing the process 600 may cause the host or hosts determined in 606 to launch one or more clone virtual machine instances of the particular virtual machine configuration that is appropriate to the set of executable software instructions. The appropriate particular virtual machine configuration may be a particular virtual machine configuration that is specified by the customer in the operations of 602 or 604 as being capable of executing the set of executable software instructions. In some embodiments, the particular virtual machine configuration may already be in CoW memory ready to be cloned as described in conjunction with FIG. 3. For example, the one or more hosts available to instantiate clones of the particular virtual machine configuration may have each of the particular virtual machine configurations that were created in 508-18 of FIG. 5 in memory as a shared static virtual machine similar to the shared static particular virtual machine configuration 318. In some implementations, the system may analyze the set of executable software instructions for characteristics (e.g., syntax, notations, manner of declaring variables, etc.) to identify the language in which the set of executable software instructions is written, and determine which of the particular virtual machine configurations is capable of executing instructions written in the identified language.

In 610, the system performing the process 600 may provide the set of executable software instructions to the clone virtual machine and cause the clone virtual machine (also referred to as a "clone" of the particular virtual machine configuration generated by operations similar to those of 506-14 of FIG. 5) to execute the set of executable software instructions. The operations actually performed by the execution of the set of executable software instructions may be at the discretion of the customer who provided or selected the set of executable software instructions. However, the data storage service may restrict access to the resources and/or data accessed by execution of the set of executable software instructions to only resources and/or data that the customer is authorized to access. In some implementations, execution of the set of executable software instructions may only access resources and/or data local to the host upon which the clone virtual machine is running. In this manner, the data storage service may allow the customer to create and execute customized software code on the customer's data while protecting other customers' data from being accessed by the customized software code.

In 612, the system performing the process 600 may determine whether execution of the set of executable instructions has completed (e.g., the task that it is designed to perform is complete). The system may make the determination by any of a variety of ways. For example, the execution may request that the system send a result of the execution to a computer system of the customer (e.g., the customer virtual machine 108 of FIG. 1). As another example, the executing program may exit. As still another example, the execution may send a notification to the system that it has completed its task. If the system determines that execution has completed, the system may proceed to 616 to provide the results of execution. If not, the system may proceed to 614.

In 614, the system performing the process 600 may determine whether the execution of the set of executable software instructions has timed out without completing its task. For example, the computing resource service provider may set a time limit on how long a given set of executable software instructions is permitted to run without completing (e.g., 5 minutes, 50 minutes, 1 week, etc.). The time limit may be designed to prevent executable code that has stopped, found itself in an infinite loop, or otherwise failed to properly complete its task from running indefinitely. If the execution has timed out, the system may proceed to 616. If not, the system may return to 612 to continue to check whether the execution has completed.

In 616, the system performing the process 600 may provide a result of the execution of the set of executable software instructions to a computer system of the customer (e.g., the customer virtual machine 108 of FIG. 1). If the execution resulted in a timeout (e.g., execution exceeded a time limit), the result returned may be a timeout result (e.g., notification that the execution timed out). Depending on the set of executable software instructions, the result may be customer data retrieved from the data store of host machine of the data storage service; in some cases, the data may or may not have been filtered, redacted, or otherwise modified by the execution. For example, the data may have been scrubbed to remove any sensitive personal or identifying information, such as credit card numbers, social security numbers, home addresses, or the like. Likewise, depending on the set of executable instructions, the result may simply be an indication of whether the execution was successful or not, whether any errors occurred during execution, and/or the duration of the execution. In various embodiments, the result may be provided to an entity in addition to or alternative to the customer, such as to the computing resource service provider or to a third party entity. In still other embodiments, the operations of 616 may be omitted, as the task may be to perform an operation (e.g., modify data) without providing a result, or may be to provide a result only in the event of a failure (or only provide a result if the task succeeded, with the lack of a result being an indication of failure to successfully perform the task).

In 617, the system performing the process*617 may determine whether another request to execute the customer code (or different customer code) has been received. If so, the system may return to 610 to cause the running clone to execute the customer code in accordance with the request. If not, the system may proceed to 618.

In 618, the system performing the process 600 may terminate the clone virtual machine. Terminating the clone virtual machine may include wiping/erasing (e.g., overwriting with zeroes or other value) any memory previously allocated/provisioned to the clone virtual machine and deallocating allocated resources (e.g., returning memory, processing capability, and/or storage space previously allocated to the clone virtual machine) back to the host system. In some embodiments, the running clone may not be terminated but may be paused or left running until another request to execute customer code is received. Note that one or more of the operations performed in 602-18 may be performed in various orders and combinations, including in parallel. For example, in some embodiments, the operations of 602 may be combined such that the customer code is received in conjunction with the request to execute the customer code.

Figure 7:
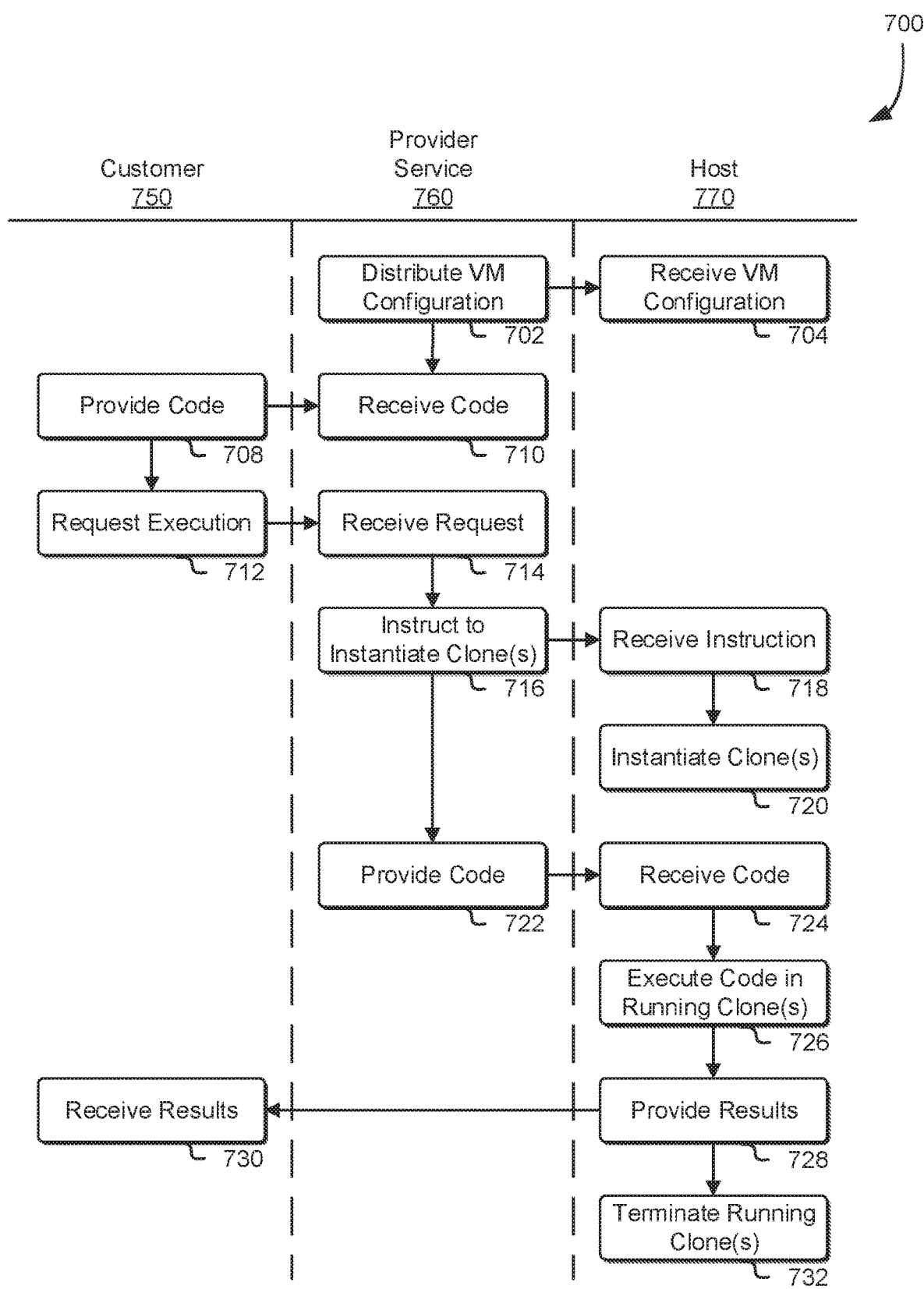
FIG. 7 is a swim diagram that illustrates an example of a process for executing software code in accordance with an embodiment.

FIG. 7 is a swim diagram illustrating an example of a process 700 for executing software code in accordance with various embodiments. Some or all of the process 700 (or any other processes described, or variations and/or combinations of those processes) may be performed under the control of computer systems configured with executable instructions and/or other data, and may be implemented as executable instructions executing on processors. The executable instructions and/or other data may be stored on a non-transitory computer-readable storage media (e.g., a computer programs persistently stored on magnetic, optical, or flash media).

For example, some or all of the operations performed by a customer 750 may be performed by a computing device such as the electronic client device 802 of FIG. 8. Likewise, some or all of the operations performed by a provider service 760 or a host 770 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. The process 700 includes a series of operations wherein the customer 750 provides software code to the provider service 760 and requests execution of the software code, and the provider service 760 in turn causes the software code to be executed in one or more clone virtual machines on the host 770.

The provider service 760 may distribute 702 a particular virtual machine configuration to the host 770, as described in conjunction with the process 500 of FIG. 5. The host 770 may be a host machine similar to the host machine 114 of FIG. 1 or the host machine 314 of FIG. 3. The host 770 may receive 704 the particular virtual machine configuration. In some embodiments, the particular virtual machine configuration is received as a Δ from a base virtual machine configuration that the host 770 already has a copy of. In this manner, in a multi-tenant system of a computing resource service provider, multiple customers of the computing resource service provider may have individual Δs from a common base image stored at the host 770 using much less storage space and memory than if the host 770 were storing entire particular virtual machine configuration images for each customer, thereby achieving a benefit of efficient use of storage resources. Furthermore, in embodiments, the base image may only need to be loaded ("pre-warmed") into memory once, and thereafter the host 770 may load the individual Δs into memory of the host 770 as needed (e.g., in response to a request), allowing the host 770 to build the particular virtual machine configurations more quickly than if the host 770 had to read entire virtual machine configuration images for the particular virtual machine configurations, since the Δs may be much smaller than an entire image.

In some embodiments, the host 770 may load (also referred to as "pre-warm") the particular virtual machine configuration into copy-on-write memory as a static shared particular virtual machine configuration, such as the shared static particular virtual machine configuration 318, such that the particular virtual machine configuration may be used to quickly create a plurality of running clones.

The customer 750 may provide 708 the software code to the provider service 760, and the provider service 760 may receive the software code. The software code may be similar to the customer code 120 of FIG. 1 or the set of executable software instructions 320 of FIG. 3. At the same time or at some time later, the customer 750 may submit 712 a request to execute the software code provided in 708. The request may be similar to the request 112 and may include a set of parameter values similar to the set of parameter values 312.

In response to receiving 714 the request, the provider service 760 may send 716 a command to the host 770 to instantiate a number of clone virtual machines as specified by the customer 750 or as determined by the provider service 760 to concurrently execute the software code. In response to receiving 718 the command, the host 770 may instantiate 720 the number of clone virtual machines specified with the command. The clone virtual machines may be similar to the running clone virtual machines 332 of FIG. 3.

The provider service may provide 722 the software code to the host 770. As a result of receiving 724 the software code, the host 770 may distribute the software code among the clones virtual machines instantiated 720. The host 770 may send a command or otherwise cause the clone virtual machines to execute 726 the software code in accordance with the submitted 712 request (e.g., according to the set of parameter values 312). Upon completion of each of the executions of the software code, the host 770 may provide 728 the results of the execution to the customer 750, and the customer 750 may receive 730 the results provided. In some implementations, the host 770 provides 728 multiple results (e.g., as each of the clone virtual machines completes execution, provides 728 a result for that clone virtual machine). In other implementations, the host 770 waits until all of the clone virtual machines instantiated 720 have completed, and provides 728 the results as a batch. In some implementations, the host 770 provides 728 the results to the provider service 760, which then provides the results to the customer 750 rather than the host 770 providing 728 the results to the customer 750 directly.

The tasks of the clone virtual machines now having been completed, the host 770 may deprovision the clone virtual machines by terminating the clone virtual machines and deallocating whatever resources (e.g., memory, storage, processor shares, etc.) were allocated/provisioned to the clone virtual machines. Deprovisioning the clone virtual machines may allow the resources that were allocated/provisioned to the clone virtual machines to be made available to be allocated/provisioned to other processes or to other clone virtual machines.

Note that one or more of the operations performed in 702-32 may be performed in various orders and combinations, including in parallel. For example, the provider service 760 may provide 722 the software code to the host 770 at any time after receiving 710 the software code and prior to the host 770 executing 726 the software code. As another example, the operations by the customer 750 of providing 708 the software code and submitting 712 the request for execution may be performed in a single operation (e.g., within a single request), and, consequently, the provider service 760 may simultaneously receive 710 the software code and receive 714 the request. Likewise, the provider service 760 may instruct 716 the host 770 to instantiate 720 the clone virtual machines and provide 722 the software code in a single operation, whereupon the host 770 may receive 724 the software code prior to instantiating 720 the clone virtual machines. Note also that in various embodiments, operations performed between the customer 750, the provider service 760, and the host 770 may include more, fewer, or different operations that depicted in the example 700. For example, in some embodiments the host 770 may not provide the results 728 to the customer 750, but may instead provide the results 728 to the provider service 760 or to a third party (not depicted). Additionally or alternatively, in some examples, the host 770 may not include the operation of terminating 732 the running clones, but may instead pause the running clones or allow the running clones to continue running.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of cloud data storage and retrieval, by enabling data storage service customers to quickly execute customized customer code on remote hosts to retrieve and manipulate data stored at the remote host with a minimal amount of fleet provisioning, thereby improving the efficiency of data operations and bandwidth usage by performing operations local to the data and avoiding the transmission of the entirety of the data across a network connection. (2) Additionally, techniques described and suggested in the present disclosure improve the efficiency of multi-tenant computer systems by instantiating concurrent virtual machine clones that share a particular virtual machine configuration copy-on-write memory, thereby enabling virtual machine clones to be instantiated quickly and in parallel with reduced memory consumption. (3) Further, techniques described and suggested in the present disclosure improve the efficiency of multi-tenant computer systems by allowing large numbers of virtual machine images to be stored with a reduced footprint (e.g., as differences ["deltas"] from a base virtual machine image), whereby those images can be instantiated rapidly from a paused state to execute software code for individual customers without having to provision resources separately for the individual customers. (4) Moreover, techniques described and suggested in the present disclosure are necessarily rooted in computer technology in order to overcome problems specifically arising with preventing unauthorized access to data of a customer of a computing resource service provider by ensuring that the concurrently executing clone virtual machines are only able to access data of the associated customer.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system 800 includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network 804 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed in detail. In an embodiment, communication over the network 804 is enabled by wired and/or wireless connections and combinations thereof. In an embodiment, the network 804 includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API requests) over a network). As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server 808 can include any appropriate hardware, software and firmware for integrating with the data store 810 as needed to execute aspects of one or more applications for the electronic client device 802, handling some or all of the data access and business logic for an application.

In an embodiment, the application server 808 provides access control services in cooperation with the data store 810 and generates content including, but not limited to, text, graphics, audio, video, and/or other content that is provided to a user, associated with the client device by the web server 806 in the form of HyperText Markup Language (HTML), Extensible Markup Language (XML), JavaScript, Cascading Style Sheets (CSS), JavaScript Object Notation (JSON), and/or another appropriate client-side or other structured language. Content transferred to a client device, in an embodiment, is processed by the electronic client device 802 to provide the content in one or more forms including, but not limited to, forms that are perceptible to the user audibly, visually, and/or through other senses. The handling of all requests and responses, as well as the delivery of content between the electronic client device 802 and the application server 808, in an embodiment, is handled by the web server 806 using PHP: Hypertext Preprocessor (PHP), Python, Ruby, Perl, Java, HTML, XML, JSON, and/or another appropriate server-side structured language in this example. In an embodiment, operations described as being performed by a single device are performed collectively by multiple devices that form a distributed and/or virtual system.

The data store 810, in an embodiment, includes several separate data tables, databases, data documents, dynamic data storage schemes, and/or other data storage mechanisms and media for storing data relating to a particular aspect of the present disclosure. In an embodiment, the data store 810 includes mechanisms for storing production data 812 and user information 816, which are used to serve content for the production side. The data store 810 also is shown to include a mechanism for storing log data 814, which is used, in an embodiment, for reporting, computing resource management, analysis, or other such purposes. In an embodiment, other aspects t such as page image information and access rights information (e.g., access control policies or other encodings of permissions) are stored in the data store 810 in any of the above listed mechanisms as appropriate or in additional mechanisms in the data store 810.

The data store 810, in an embodiment, is operable, through logic associated therewith, to receive instructions from the application server 808 and obtain, update, or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described or may be provided by a content management system (CMS) operating on, or under the control of, the application server 808. In an embodiment, a user, through a device operated by the user, submits a search request for a certain type of item. In this example, the data store 810 accesses the user information 816 to verify the identity of the user, accesses the catalog detail information to obtain information about items of that type, and returns the information to the user, such as in a results listing on a web page that the user is views via a browser on the electronic client device 802. Continuing with the example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically will include an operating system that provides executable program instructions for the general administration and operation of that server and includes a computer-readable storage medium (e.g., a hard disk, random access memory, read only memory, etc.) storing instructions that if executed (i.e., as a result of being executed) by a processor of the server cause or otherwise allow the server to perform its intended functions.

The system, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating systems, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, the system 800 utilizes at least one network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols. The network 804, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In an embodiment, the system 800 utilizes a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system 800 includes a variety of data stores and other memory and storage media as discussed above. These can reside in a variety of locations, such as on a storage medium local to (and/or resident in) one or more of the computers or remote from any or all of the computers across the network 804. In an embodiment, the information resides in a storage-area network (SAN) familiar to those skilled in the art, and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit (CPU or "processor"), at least one input device (e.g., a mouse, keyboard, controller, touch screen, or keypad), and at least one output device (e.g., a display device, printer, or speaker), at least one storage device, such as a disk drive, a optical storage device, or a solid-state storage device such as random access memory (RAM) or read-only memory (ROM), as well as removable media devices, memory cards, flash cards, etc., and various combinations.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, system 800 and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. In embodiment, a process such as those processes described (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors, for example, a non-transitory computer-readable storage medium stores instructions and a main CPU executes some of the instructions while a graphics processor unit executes other of the instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described and such that a single device does not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    deriving a virtual machine configuration from a base virtual machine; distributing a runtime state of the virtual machine configuration among a set of host machines provided by a computing resource service provider;
    receiving, from a client device associated with a customer of the computing resource service provider, a request to perform one or more data operations by executing customer-provided software code on a host machine of the set of host machines;
    causing a set of clone virtual machines based on the virtual machine configuration in memory to execute on the host machine;
    executing the customer-provided software code in the set of clone virtual machines; determining that a data operation of the one or more data operations has completed for a virtual machine of the set of virtual machines;
    selecting, based on whether the virtual machine configuration is capable of executing the customer-provided software code, the virtual machine configuration from a plurality of different virtual machine configurations; and
    providing results of the data operation in response to the request.

2. The computer-implemented method of claim 1, wherein:
    the computer-implemented method further comprises:
        executing the base virtual machine to stable state; and
        storing the base virtual machine in a repository as a base virtual machine image; and
    the virtual machine configuration is derived from the base virtual machine image.

3. The computer-implemented method of claim 1, wherein the set of host machines load the virtual machine configuration in copy-on-write pages of the memory.

4. The computer-implemented method of claim 1, further comprising halting the virtual machine as a result of determining that the data operation has completed.

5. The computer-implemented method of claim 1, wherein the host machines are host machines of a distributed data object storage service provided by the computing resource service provider.

6. The computer-implemented method of claim 1, further comprising, prior to receiving the request to perform the one or more data operations, causing the set of host machines to load, based at least in part on the runtime state, the virtual machine configuration into the memory.

7. A system, comprising: one or more processors; and
    memory including executable instructions that, as a result of being executed by the one or more processors, cause the system to:
    load a set of virtual machine configurations in the memory, individual virtual machine configurations of the set of virtual machine configurations being runtime states of virtual machines at particular points in time;
    receive, from a client device associated with a customer of a service provider that hosts the system, a set of software instructions that, as a result of being executed, performs a data operation;
    receive a request to execute the set of software instructions using a selected virtual machine configuration of the set of virtual machine configuration;
    execute, in a virtual machine derived from the selected virtual machine configuration, the set of software instructions;
    select, based on whether the virtual machine configuration is capable of executing the set of software instructions, a virtual machine configuration from the set of virtual machine configurations; and
    provide results of the data operation in response to the request.

8. The system of claim 7, wherein the executable instructions that cause the system to execute the set of software instructions include executable instructions that cause the system to execute copies of the set of software instructions concurrently in a plurality of virtual machines derived from the virtual machine configuration of the set of virtual machine configurations.

9. The system of claim 7, wherein the executable instructions further include instructions that cause the system to, as a result of completing execution of the set of software instructions, deprovision the virtual machine.

10. The system of claim 7, wherein execution of the set of software instructions in the virtual machine causes the virtual machine to:
 read a data object from a data store of the system;
 modify the data object to produce a modified data object; and
 write the modified data object to the data store.

11. The system of claim 7, wherein the virtual machine is derived, at least in part, as a result of selection of the virtual machine configuration via an interface of the client device.

12. The system of claim 7, wherein the executable instructions that cause the system to load the set of virtual machine configurations in memory further include instructions that cause the system to derive the virtual machine configuration based at least in part on:
 a base virtual machine image of a base virtual machine; and
 a difference between a state of the virtual machine configuration and the base virtual machine.

13. The system of claim 7, wherein the request is received from another virtual machine associated with the customer.

14. The system of claim 7, wherein the system is a host machine of a data storage service provided by a service provider to the customer as a service.

15. A non-transitory computer-readable storage medium having stored thereon executable instructions that, in response to execution by one or more processors of a computer system, cause the computer system to at least:
 receive, from a device associated with a customer of a service provider that hosts the computer system, a set of software instructions that, as a result of being executed by a virtual machine of a host machine, causes the host machine to perform a data operation;
 receive a request to execute the set of software instructions;
 provision the virtual machine on the host machine based at least in part on:
  a base virtual machine image of a base virtual machine; and
  a difference between a state of the base virtual machine and a selected virtual machine configuration;
 cause the virtual machine to execute the set of software instructions to cause the host machine to perform the data operation;
 select, based on whether a virtual machine configuration is capable of executing the set of software instructions, a virtual machine configuration from a set of virtual machine configurations;
 deprovision the virtual machine; and
 provide results of the data operation in response to the request.

16. The non-transitory computer-readable storage medium of claim 15, wherein the executable instructions further include instructions that cause the computer system to:
 create a set of virtual machine configurations derived from the base virtual machine, wherein the set of virtual machine configurations includes the selected virtual machine configuration;
 pause the set of virtual machine configurations; and
 distribute runtime states of the set of virtual machine configurations among a plurality of host machines of which the host machine is a member.

17. The non-transitory computer-readable storage medium of claim 15, wherein the executable instructions that deprovision the virtual machine include instructions that cause the computer system to:
 terminate execution of the virtual machine;
 erase memory allocated to the virtual machine; and
 deallocate resources, including the memory, from the virtual machine.

18. The non-transitory computer-readable storage medium of claim 15, wherein the host machine is hosted in a data storage service provided by the service provider to the customer.

19. The non-transitory computer-readable storage medium of claim 15, wherein the executable instructions that cause the computer system to deprovision the virtual machine cause the computer system to deprovision the virtual machine as a result of execution of the set of software instructions exceeding a time limit.

20. The non-transitory computer-readable storage medium of claim 15, wherein the set of software instructions that cause the host machine to perform the data operation cause the host machine to:
 read a first data object from a data store of a data storage service;
 determine that the first data object is a mismatch to specified criteria; and
 read a second data object from the data store.

21. The non-transitory computer-readable storage medium of claim 20, wherein the set of software instructions that cause the host machine to perform the data operation further cause the host machine to:
 determine that the second data object is a match to the specified criteria; and
 provide the second data object in response to the request.

* * * * *